(12) United States Patent
Chou et al.

(10) Patent No.: US 8,081,211 B2
(45) Date of Patent: Dec. 20, 2011

(54) REVERSE OR PERIPHERAL SENSING SYSTEM FOR A VEHICLE

(75) Inventors: Hong-Long Chou, Taipei (TW); Chao-Wen Lin, Taichung (TW)

(73) Assignee: Altek Corporation, Hsinchu (TW)

( * ) Notice: Subject to any disclaimer, the term of this patent is extended or adjusted under 35 U.S.C. 154(b) by 488 days.

(21) Appl. No.: 12/344,097

(22) Filed: Dec. 24, 2008

(65) Prior Publication Data

US 2009/0167856 A1 Jul. 2, 2009

(30) Foreign Application Priority Data

Dec. 28, 2007 (TW) ................................ 96150965 A (51) Int. Cl.
*H04N 7/18* (2006.01)
(52) U.S. Cl. ......... 348/118; 348/119; 348/148; 348/159
(58) Field of Classification Search .................. None
See application file for complete search history.

(56) References Cited

U.S. PATENT DOCUMENTS

| | | | |
|---|---|---|---|
| 7,069,128 B2* | 6/2006 | Iwama | 701/36 |
| 2006/0119472 A1* | 6/2006 | Tsuboi | 340/435 |
| 2006/0209194 A1* | 9/2006 | Liu et al. | 348/218.1 |
| 2007/0057816 A1* | 3/2007 | Sakakibara et al. | 340/932.2 |
| 2009/0160940 A1* | 6/2009 | Imamura | 348/159 |
| 2010/0007734 A1* | 1/2010 | Yamazaki et al. | 348/148 |

\* cited by examiner

*Primary Examiner* — John B. Walsh
(74) *Attorney, Agent, or Firm* — Rabin & Berdo, P.C.

(57) ABSTRACT

A reverse sensing system displaying an overhead vehicle image includes a plurality of fisheye lenses, a trip computer, and a screen. The fisheye lenses are disposed on all sides of the vehicle to shoot the surrounding scene images of the vehicle. The trip computer reads the scene images, and executes a plurality of built-in image processing procedures to combine the scene images into an overhead vehicle image. The radially distorted scene images are corrected into the normal scene images through a distorted image correction procedure. The corrected scene images are rotated into projection scene images through a planar transition procedure. The images are retrieved according to the positions of the shooting lenses of the projection scene images so as to generate the overhead vehicle image through an image combining procedure.

10 Claims, 6 Drawing Sheets

REVERSE OR PERIPHERAL SENSING SYSTEM FOR A VEHICLE

CROSS-REFERENCE TO RELATED APPLICATIONS

This non-provisional application claims priority under 35 U.S.C. §119(a) on Patent Application No(s). 096150965 filed in Taiwan, R.O.C. on Dec. 28, 2007 the entire contents of which are hereby incorporated by reference.

BACKGROUND OF THE INVENTION

1. Field of Invention

The present invention relates to reverse (or peripheral) sensing system, and more particularly to a reverse sensing system displaying an overhead view of a region around a vehicle (or "overhead vehicle image").

2. Related Art

Unexpected events of the cars when traveling often occur due to carelessness of the drivers, visual dead angle, or variation of external environment. Along with the development of the electronic information technique, many researchers are devoted themselves to develop a parking assist system incorporating a powerful operation capability of a trip computer and an image-capturing technique, so as to alert the drivers before the accidents, thereby effectively assisting the drivers during traveling. The parking assist system (e.g. a common reverse sensing system) senses a distance to an impediment behind the vehicle by the use of an ultrasonic sensor, and the approach of the impediment is notified by a sound with different volumes and frequencies. With the popularization of the image sensors, some of the reverse sensing systems may further shoot the real scene image for the drivers to intuitively sense a space relation between the vehicle and the impediment around the vehicle. The low skill drivers use the parking assist system when parking, so as to prevent colliding with the impediment around the vehicle to cause damages of the vehicle.

Figure 1A:
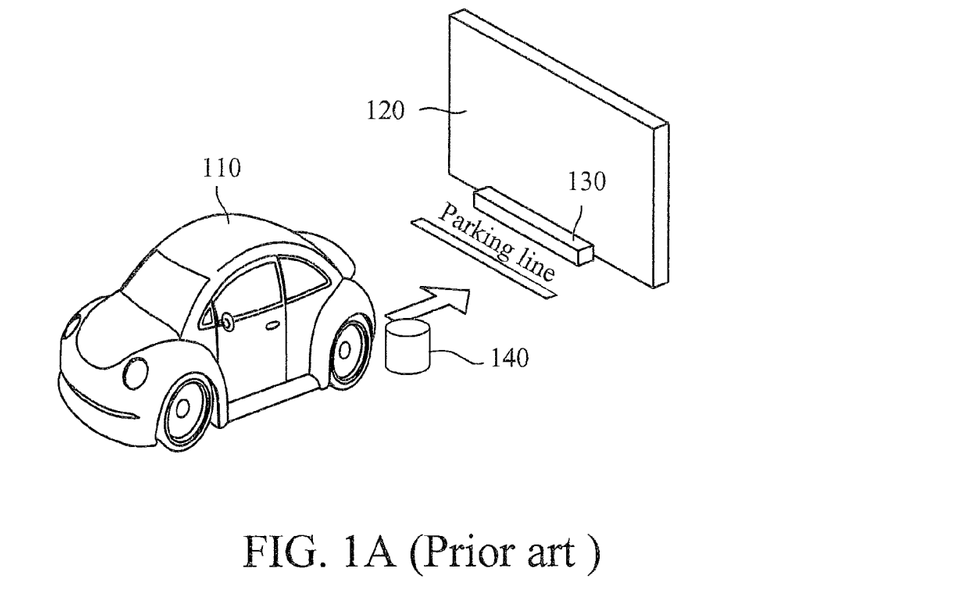
FIG. 1A is a schematic view of reversing a vehicle.
Figure 1B:
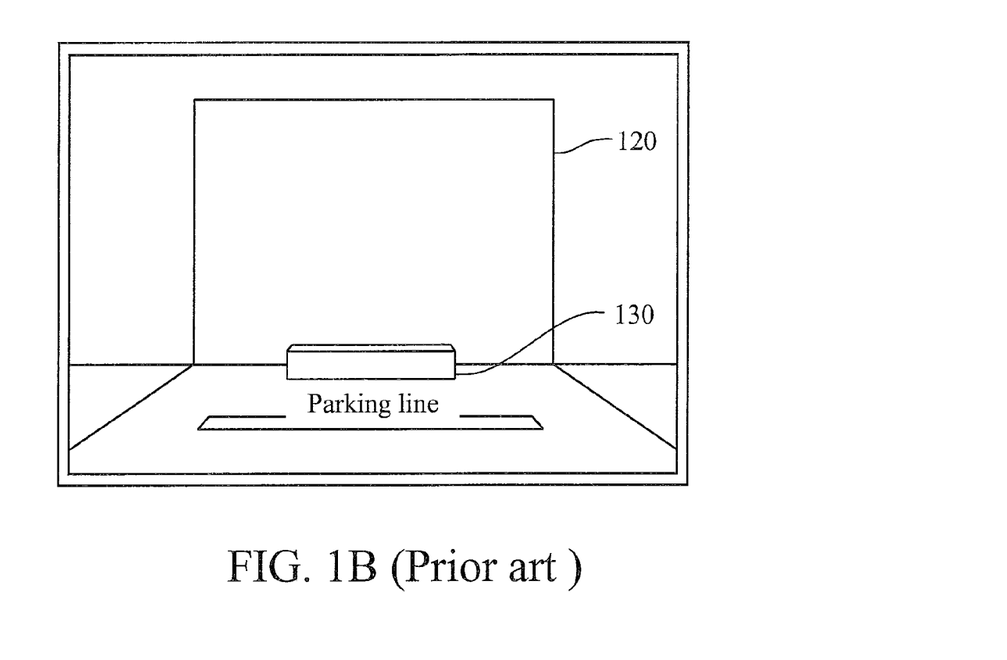
FIG. 1B shows a scene image shot by the reverse sensing system of the prior art.

However, the reverse sensing system providing the image shot behind the vehicle still has defects. FIG. 1A is a schematic view of reversing the vehicle, and FIG. 1B is a schematic view of the scene image shot by the reverse sensing system of the prior art. Referring to FIGS. 1A and 1B, for example, the driver intends to park a vehicle 110 before a parking line in front of a wall 120. When the reverse of the vehicle 110 starts, the reverse sensing system shoots the scene behind the vehicle, and displays the shot image on a screen of the reverse sensing system. However, due to the dead angle of shooting, the impediment 140 behind the vehicle 110 cannot be displayed in the shot image. For example, the impediment 140 in FIG. 1A cannot be displayed in the image of FIG. 1B. When the driver just relies on the shot image to reverse the vehicle, the vehicle may collide with the impediment 140 to cause damages of the vehicle. Some reverse sensing systems shoot the scene images from different angles and positions, and switch between the scene images at different angles and positions to assist the drivers when reversing the vehicles. However, the switching between the scene images attracts the driver's attention, such that the driver cannot concentrate on driving.

SUMMARY OF THE INVENTION

In view of the problem that the driver cannot concentrate on driving since the reverse sensing system switches the shot scene images, the present invention is directed to providing a reverse sensing system displaying the overhead vehicle image. The surrounding scene of the vehicle is shot by fisheye lenses disposed on all sides of the vehicle. A plurality of distorted shot images are restored to normal images through an image processing method, so as to generate an overhead vehicle image displayed on a screen of the reverse sensing system, such that the driver can easily determine the distance between the vehicle and the impediment around the vehicle.

In order to achieve the above objective, the reverse sensing system displaying the overhead vehicle image of the present invention includes a plurality of fisheye lenses, a trip computer, and a screen. The fisheye lenses are discretely disposed on all sides of the vehicle, for shooting a plurality of scene images. The trip computer reads the scene images, and executes a plurality of built-in image processing procedures to combine the scene images to an overhead vehicle image which is displayed on the screen when the vehicle is reversed. The plurality of image processing procedures include:

a distorted image correction procedure: reading radially distorted scene images, and calculating a central deformation ratio according to a plurality of pixels at the central portions of the scene images, so as to correct the scene images;

a planar transition procedure: setting a rotation amount according to the disposed positions of the fisheye lenses, and rotating the corrected scene images according to the rotation amount, so as to generate projection scene images; and an image combining procedure: retrieving trusted zones of the projection scene images according to the disposed positions of the fisheye lenses of the projection scene images, so as to combine the images into the overhead vehicle image.

In the reverse sensing system according to a preferred embodiment of the present invention, positions of the fisheye lenses discretely disposed on the vehicle include a front bumper, a rear bumper, a left rear-view mirror, and a right rear-view mirror.

In the reverse sensing system according to a preferred embodiment of the present invention, the distorted image correction procedure includes the following steps. First, the radially distorted scene images are read. Next, the central deformation ratio of the plurality of scene images is calculated by using a plane correcting function according to the plurality of central pixels at the central portions of the plurality of shot scene images. Then, the central pixels of the scene images are taken as a reference for correcting positions of all the pixels in the scene images according to the calculated central deformation ratio, so as to restore these scene images to undistorted normal images.

The plane correcting function is expressed by a following mathematical expression:

$$P-E=(Q-E)/L(r_d,k);$$

In the mathematical expression, P is positions of the central pixels before the correction, Q is positions of the central pixels after the correction, E is a central point of the scene image, $r_d$ is a distance from Q to E, k is a deformation constant, and $L(r_d,k)$ is a deformation degree function of the scene image. In addition, the deformation degree function of the scene image is expressed by:

$$L(r_d,k)=1+k_1 \ast r_d^2+k_2 \ast r_d^4+\ldots+k_p \ast r_d^{2p}; \text{ wherein } k_1, k_2, \text{ and } k_p \text{ are deformation constants.}$$

In the reverse sensing system according to a preferred embodiment of the present invention, the planar transition procedure includes the following steps. First, the corrected scene images are read. Next, a rotation amount of the corrected scene image is determined according to the disposed positions of the fisheye lenses. Then, the scene images are rotated according to the rotation amount, so as to generate a plurality of projection scene images. In addition, the planar transition procedure further includes setting a feature point of the shot scene images, and rotating the scene images into the projection scene images by taking the feature point as a reference.

In the reverse sensing system according to a preferred embodiment of the present invention, the image combining procedure includes the following steps. First, a trusted zone of the projection scene image is retrieved according to the disposed position of the fisheye lens of the projection scene image. Next, the plurality of feature points in the trusted zone of the projection scene image is analyzed. Then, the feature points similar to those of the adjacent projection scene images are found. Finally, the projection scene image is pasted into an overhead vehicle view according to the positions of the feature points.

As described above, in the reverse sensing system of the present invention, the plurality of fisheye lenses are used to shoot the plurality of real scene images, and the distorted images are restored to the normal images. Next, the corrected scene images are rotated to the projection scene images viewed from the top. Then, through the image combining procedure, the projection scene images are pasted into the an overhead vehicle view by taking the position of the similar feature point in the two adjacent projection scene images as the reference. The overhead vehicle view is then displayed on the screen of the reverse sensing system, such that the driver can easily determine the distance relation between the vehicle and the impediment.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The objectives and implementations of the present invention will be described in detail below with reference to preferred embodiments. However, the concepts of the present invention can also be used in other scope. The embodiments below are merely used to illustrate the objectives and implementations of the present invention, but not to limit the scope of the present invention.

Figure 2A:
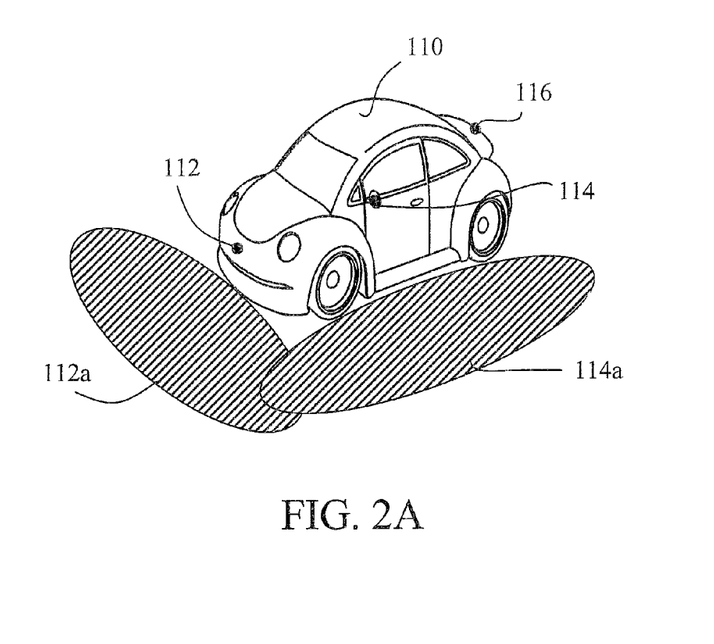
FIG. 2A is a schematic view of disposed positions and shooting ranges of fisheye lenses of a reverse sensing system displaying an overhead vehicle image according to a preferred embodiment of the present invention.
Figure 2B:
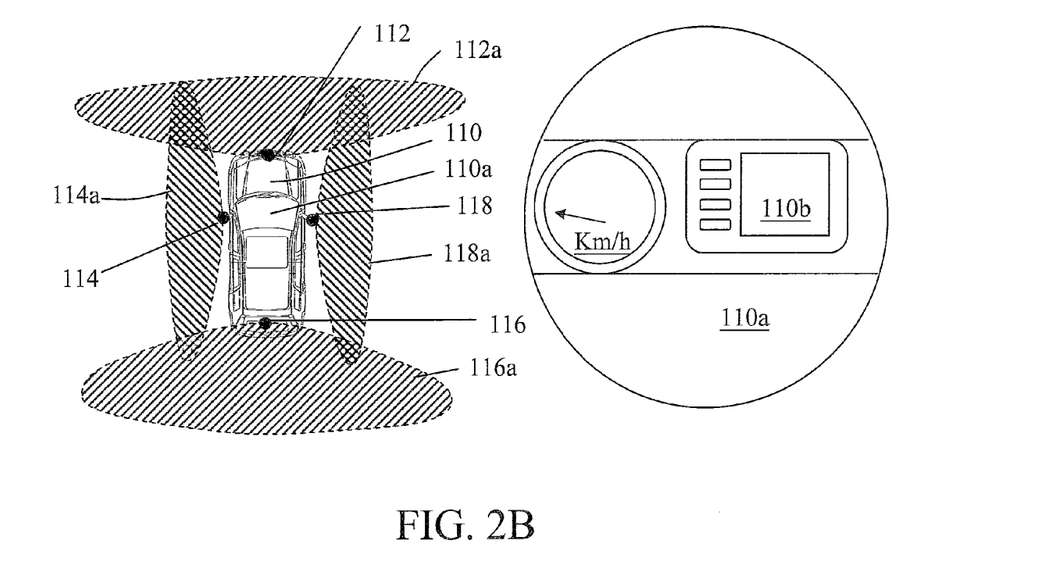
FIG. 2B is a schematic overhead view of a reverse sensing system according to a preferred embodiment of the present invention.

FIG. 2A is a schematic view of disposed portions and shooting ranges of fisheye lenses of a reverse sensing system displaying an overhead vehicle image of a preferred embodiment of the present invention. FIG. 2B is a schematic overhead view of a reverse sensing system according to a preferred embodiment of the present invention. Referring to FIG. 2B and then FIGS. 2A and 2B together, in this embodiment, the fisheye lenses are discretely disposed on the vehicle, for example, a fisheye lens (112, 114, 116, 118) is respectively disposed on the front bumper, the rear bumper, the left rear-view mirror, and the right rear-view mirror. By using the wide angle characteristic of the fisheye lens, the scene images around the vehicle are shot. For example, regions 112a, 114a, 116a, 118a are shot through the fisheye lenses (112, 114, 116, 118). Then, the overhead vehicle image is generated by using the plurality of shot scene images, and the overhead vehicle image is displayed on the screen. When the driver reverses the vehicle, the distance between the vehicle and the impediment around the vehicle can be quickly determined through the overhead vehicle image. The reverse sensing system (hereafter referred to as the vehicle reverse system) displaying the overhead vehicle image includes a plurality of fisheye lenses (112, 114, 116, 118), a trip computer 110a, and a screen 110b. After the scene images are shot by the fisheye lenses (112, 114, 116, 118), the trip computer 110a reads the scene images, and executes a plurality of built-in image processing procedures to combine the plurality of scene images into a single overhead vehicle image. The plurality of image processing procedures include a distorted image correction procedure, a planar transition procedure, and an image combining procedure.

1. The distorted image correction procedure: the vehicle reverse system reads the radially distorted scene images shot by the fisheye lenses, and calculates a central deformation ratio according to a plurality of pixels at the central portions of the scene images, so as to correct the scene images.

2. The planar transition procedure: a rotation amount of the shot scene images is set according to positions of the fisheye lenses, and the corrected scene images are rotated to projection scene images according to the rotation amount.

3. The image combining procedure: trusted zones of the projection scene images are retrieved according to the positions of the fisheye lenses of the projection scene images, so as to be combined to the overhead vehicle image.

Figure 3A:
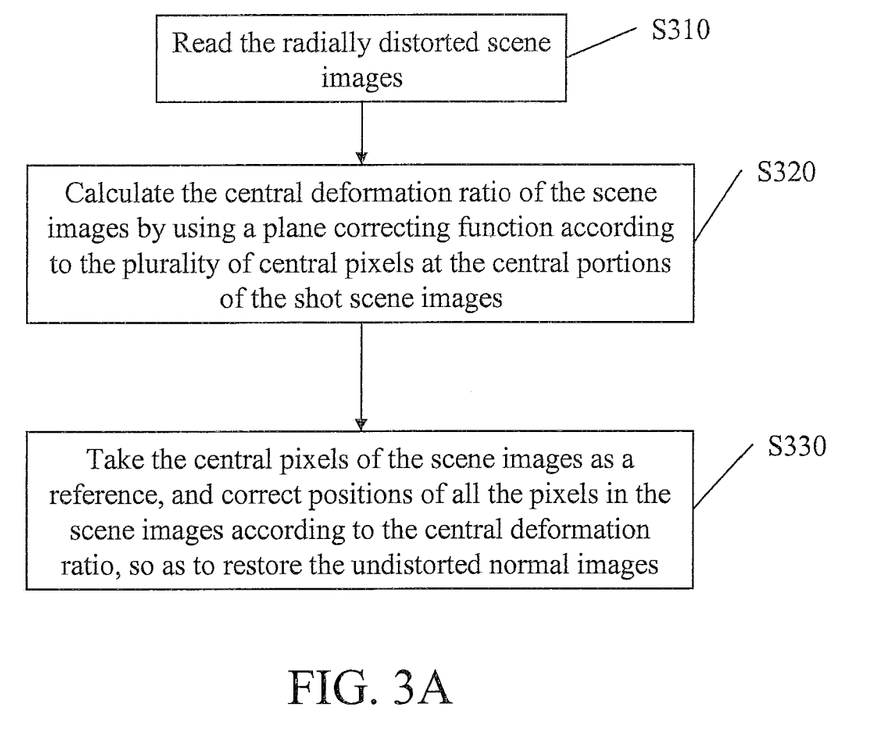
FIG. 3A is a flow chart of a distorted image correction procedure of a preferred embodiment of the present invention.

In the following paragraphs, the details of the flow of the image processing procedure are described. FIG. 3A is a flow chart of a distorted image correction procedure of a preferred embodiment of the present invention. Referring to FIG. 3A, the distorted image correction procedure includes the following steps. First, the plurality of radially distorted scene images are read (step S310). Next, the central deformation ratio of the scene images is calculated by using a plane correcting function according to the plurality of central pixels at the central portions of the plurality of shot scene images (step S320). Then, the central pixels of the scene images are taken as a reference for correcting positions of all the pixels in the scene images according to the calculated central deformation ratio, so as to restore the distorted images to normal images (step S330).

Figure 3B:
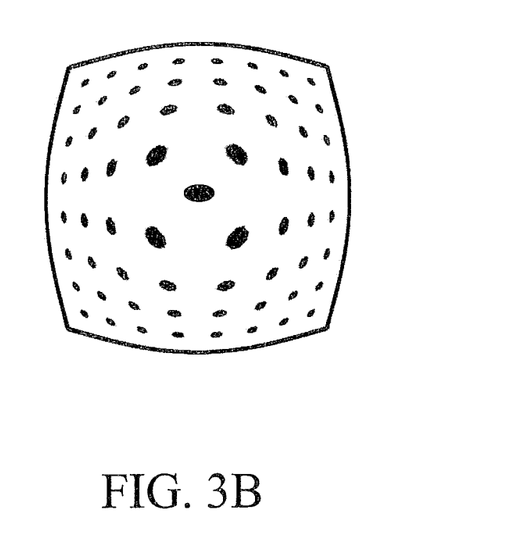
FIG. 3B shows a scene image shot by a reverse sensing system displaying an overhead vehicle image according to a preferred embodiment of the present invention.

FIG. 3B shows the scene image shot by the reverse sensing system displaying the overhead vehicle image of a preferred embodiment of the present invention. Referring to FIG. 3B, the scenes images shot by the fisheye lenses are characterized in that the pixel pitch in the central region is larger, and a farther distance to the central point of the shot image may cause a smaller pixel pitch. The image produces a visually feeling that the image is radially distorted from the central point to the periphery. The central region includes fewer pixels (including few image information), but the edge of the image includes more pixels (including more image information). In this embodiment, after the scene image is loaded in the vehicle reverse system, the central deformation ratio of the scene image is calculated by using a plane correcting function. The plane correcting function is expressed by:

$$P-E=(Q-E)/L(r_d,k)$$

wherein P is positions of the central pixels before the correction, Q is positions of the central pixels after correction, E is a central point of the scene image, $r_d$ is a distance from Q to E, k is a deformation constant, and $L(r_d,k)$ is a deformation degree function of the scene image. In this embodiment, the deformation degree function is:

$$L(r_d,k)=1+k_1*r_d^2+k_2*r_d^4+\ldots+k_p*r_d^{2p}, \text{ wherein } k_1, k_2, \text{ and } k_p \text{ are deformation constants.}$$

The deformation degree function can simulate most of the deformations of the fisheye lens. In this embodiment, a quadratic function of the deformation degree function is used as the deformation degree function $L(r_d,k)=1+k_1*r_d^2$, that is, indicating that the image has the two-dimensional deformation.

Generally speaking, usually, the deformation constants are set in the vehicle reverse system before leaving the factory, and the deformation constants can be curvature radius of the fisheye lens and other parameters. Through the plane correcting function, the vehicle reverse system can calculate the distance between each pixel in the loaded scene image and the central pixel of the scene image.

Figure 3C:
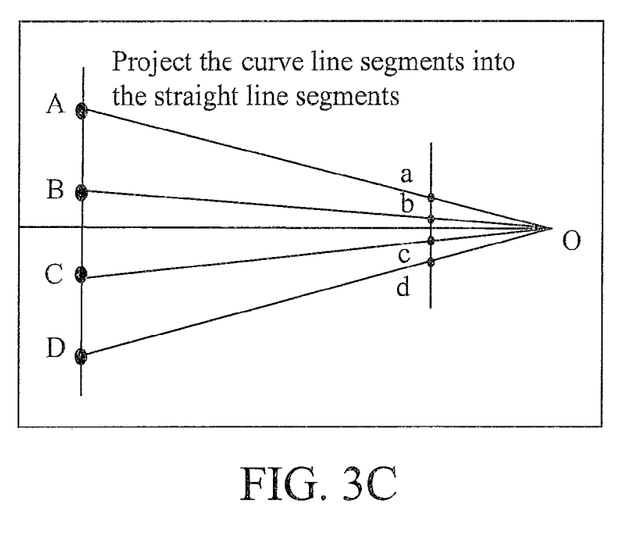
FIG. 3C is a schematic view illustrating principles of a distorted image correction procedure of a reverse sensing system displaying an overhead vehicle image according to a preferred embodiment of the present invention.
Figure 3D:
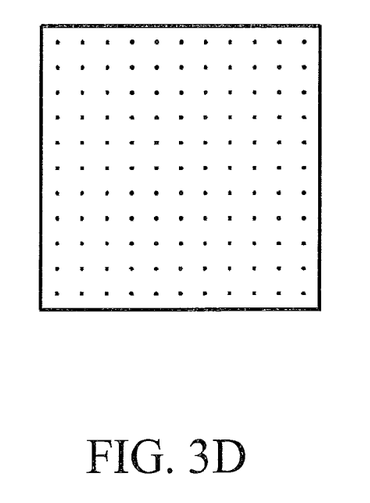
FIG. 3D shows a scene image after correction of FIG. 3B.

FIG. 3C is a schematic view illustrating principles of a distorted image correction procedure of a reverse sensing system displaying an overhead vehicle image according to a preferred embodiment of the present invention. Referring to FIGS. 3B and 3C, it is assumed that equidistant line segments $\overline{AB}$, $\overline{BC}$, and $\overline{CD}$ exist, the image of FIG. 3B is shot by the fisheye lens, and the line segments in the image are distorted to curve line segments with different lengths. Through the distorted image correction procedure, the effect that non-equidistant curve line segments ($\overline{AB}$, $\overline{BC}$, and $\overline{CD}$) are projected to be equidistant straight line segments ($\overline{ab}$, $\overline{bc}$, and $\overline{cd}$) is achieved. Based on the above principle, the distance between the distorted pixel and the central pixel of the scene image is calculated again, so as to correct the positions of all the pixels, thereby restoring the distorted images to normal scene images after correction in FIG. 3D.

Figure 4A:
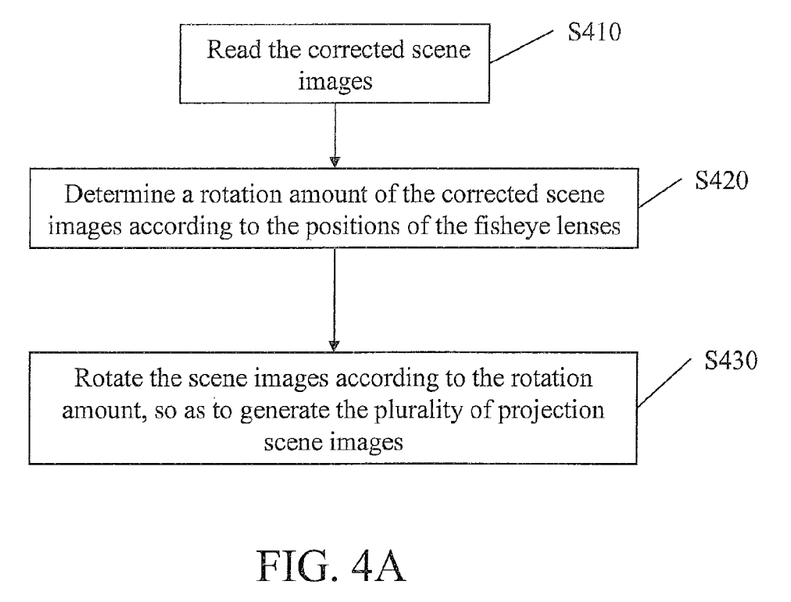
FIG. 4A is a flow chart of a planar transition procedure of a preferred embodiment of the present invention.

FIG. 4A is a flow chart of a planar transition procedure of a preferred embodiment of the present invention. Referring to FIG. 4A, first, the corrected scene images are read (step S410). Then, a rotation amount of the plurality of corrected scene images is determined according to the disposed positions of the fisheye lenses (step S420). The scene images are rotated according to the rotation amount, so as to generate the plurality of projection scene images. In some embodiments, a feature point is disposed in the shot scene images, and the scene images are rotated to the projection scene images by taking the feature point as a reference.

Figure 4B:
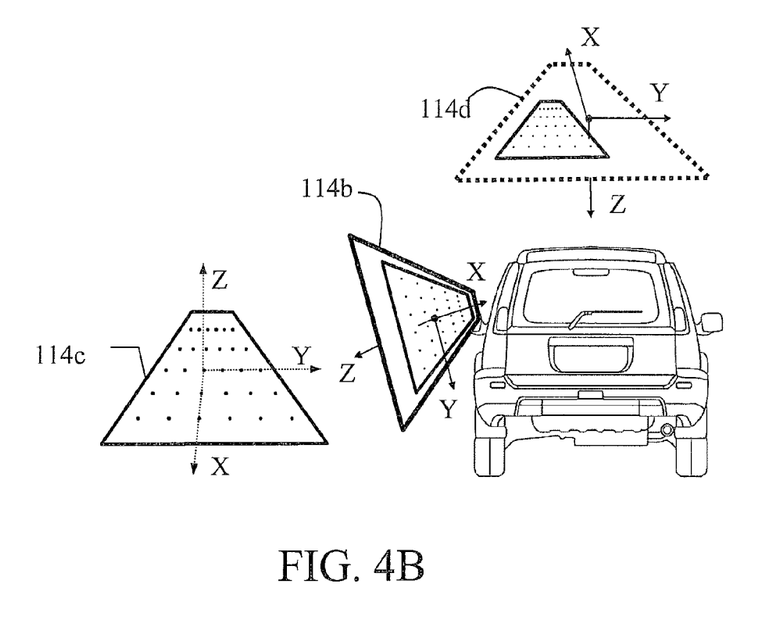
FIG. 4B is a schematic view illustrating principles of the planar transition procedure of the preferred embodiment of the present invention.

FIG. 4B is a schematic view illustrating principles of the planar transition procedure of a preferred embodiment of the present invention. Referring to FIG. 4B, after being corrected to the undistorted normal images, the image angle of the scene image 114b shot by the fisheye lens must be rotated to coincide with the angle of viewing the vehicle from the top. In this embodiment, for example through a planar homo-graphy matrix, the planar scene image 114b shot by the fisheye lens at a certain position is rotated to a scene image 114c relative to the land surface with reference to a displacement amount of the camera coordinates system relative to the world coordinates. Then, the scene image is multiplied with a transition matrix according to the disposed position of the fisheye lens shooting the scene image, so as to be converted to a projection scene image 114d viewed at another position.

For example, $H_{3\times 4}$ is a matrix of the scene image, $K_{3\times 3}$ is an internal parameter of the camera, $T_{3\times 1}$ and $R_{3\times 3}$ are displacement amount and rotation amount (i.e. the rotation amount set according to the position of the fisheye lens) of the camera coordinates system relative to the world coordinates (Ow, Xw, Yw, Zw), and [x, y, z, 1] and "u, v, l" are respectively three-dimensional coordinates points of the scene image 114c in the world coordinates system and two-dimensional point coordinates projected onto the image plane. The projection scene image may be represented by a "u, v, l" matrix, and the formula of the matrix may be expressed by:

$$\begin{bmatrix} u \\ v \\ l \end{bmatrix} \cong H_{3\times 4} \begin{bmatrix} x \\ y \\ z \\ l \end{bmatrix} = K_{3\times 3}[R_{3\times 3} | T_{3\times 1}] \begin{bmatrix} x \\ y \\ z \\ l \end{bmatrix}$$

According to the formula, referring to FIG. 4B, black points in the scene image 114c relative to the land surface are named black feature points. The black feature points are coplanar with the ground, so the relation among the group of the black feature points may be expressed by a planar equation as follows:

$$[a \quad b \quad c] \cdot \begin{bmatrix} x \\ y \\ z \end{bmatrix} = 1$$

After operation through the mathematical expression, a 3*3 matrix can be obtained. Then, for the scene image 114 relative to the land surface, the image plane shot by the camera lens is correlated with the image shot by the virtual overhead view shooting lens:

$$\begin{bmatrix} u' \\ v' \\ 1 \end{bmatrix} \cong M_{3\times 3} \begin{bmatrix} u \\ v \\ 1 \end{bmatrix}$$

wherein:

$$M_{3\times 3}=K'_{3\times 3}R'_{3\times 3}K_{3\times 3}^{-1}+K'_{3\times 3}T'_{3\times 1}[a \ b \ c]^T K_{3\times 3}^{-1}$$

If the $M_{3 \times 3}$ matrix is known, the ground image shot at any time point can be converted into an overhead view image.

Figure 5A:
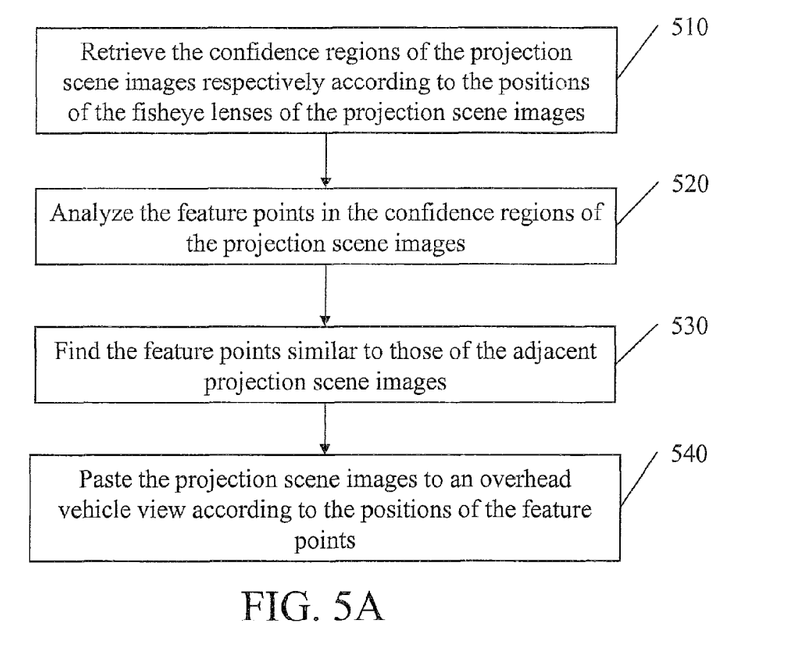
FIG. 5A is a flow chart of an image combining procedure of a preferred embodiment of the present invention.

After the projection scene image is obtained, the trip computer 110a of the vehicle reverse system continues to execute the image combining procedure to combine the scene images shot at different position of the vehicle to a single overhead vehicle image. FIG. 5A is a flow chart of the image combining procedure of a preferred embodiment of the present invention. Referring to FIG. 5A, first, the trusted zones of the projection scene images are respectively retrieved according to the positions of the fisheye lenses of the projection scene images (step S510).

Figure 5B:
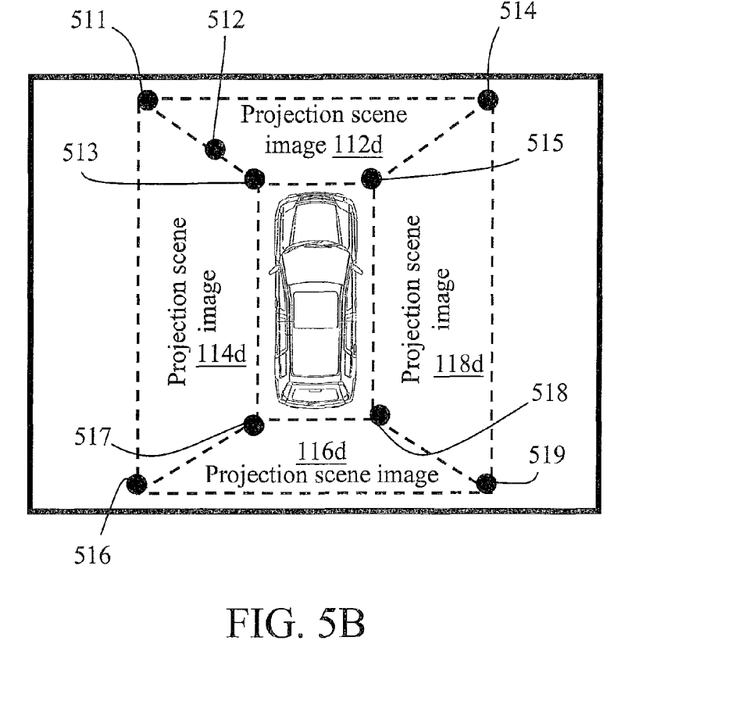
FIG. 5B is a schematic view of an overhead vehicle image combined by the image combining procedure of a preferred embodiment of the present invention.

Next, the plurality of feature points in the trusted zones of the projection scene images is analyzed (step S520). Then, the feature points similar to those of the adjacent projection scene images are found (step S530). Finally, the projection scene images are pasted to an overhead vehicle view according to the positions of the feature points (step S540). FIG. 5B is a schematic view of the overhead vehicle image combined through the image combining procedure of a preferred embodiment of the present invention. Referring to FIGS. 2B and 5B, the trip computer of the reverse sensing system executes the distorted image correction procedure and the planar transition procedure on the scene images shot by the fisheye lens 112, 114, 116, 118, so as to generate projection scene images 112d, 114d, 116d, 118d. Then, the feature points similar to those of the adjacent projection scene image are found, for example, the shot impediment, or the traffic signs on the road etc., so as to define a selection scope in the projection scene image. The selected part of each projection scene image is pasted to the corresponding region, for example, the projection scene image 112d is pasted to the left block of the vehicle of the figure, so as to form the overhead vehicle image. For example, the projection scene image 112d has the feature points 511, 512, 513, and the projection scene image 114d also have the same feature points 511, 512, 513, such that the projection scene image 112d and the projection scene image 114d are joined through the feature point 511, 512, 513. As other projection scene images, for example, projection scene image 116d and projection scene image 118d, are combined in the same manner. For example, the projection scene image 112d and the projection scene image 118d are combined through the feature points 514 and 515, the projection scene image 114d and the projection scene image 116d are combined through the feature points 516 and 517, and the projection scene image 116d and the projection scene image 118d are combined through the feature points 518 and 519. Then, each projection scene image is pasted to the corresponding part in the figure, so as to form the overhead vehicle image. After the overhead vehicle image is formed, the overhead vehicle image is further displayed on the screen, such that the driver can observe the distance between the vehicle and the object around the vehicle, thereby preventing colliding with the impediment or people to cause damages to the vehicle or even hurt people when reversing the vehicle.

What is claimed is:

1. A peripheral sensing system displaying an overhead view of a region around a vehicle, for shooting a real scene around the vehicle and generating the overhead view for display to a driver of the vehicle so as to assist a driver when maneuvering the vehicle, the system comprising:

a plurality of fisheye lenses, scattered on all sides of the vehicle, for shooting scene images;

a trip computer, for reading the scene images, and executing a plurality of built-in image processing procedures to combine the scene images into the overhead view of a region around the vehicle, wherein the plurality of image processing procedures comprise:

a distorted image correction procedure, for reading radially distorted scene images, calculating a central deformation ratio according to a plurality of pixels at central portions of the scene images, and correcting the scene images;

a planar transition procedure, for setting a rotation amount according to positions of the fisheye lenses, and rotating the scene images into projection scene images according to the rotation amount; and an image combining procedure, retrieving trusted zones of the projection scene images according to the disposed positions of the fisheye lenses of the projection scene images, so as to combine the images to the overhead view; and a screen, for displaying the overhead view when the vehicle is maneuvered, and wherein the distorted image correction procedure comprises:

reading the radially distorted scene images;

calculating the central deformation ratio of the scene images by using a plane correcting function according to the plurality of central pixels at the central portions of the scene images; and correcting positions of all the pixels in the scene images according to the central deformation ratio by taking the central pixels of the scene images as a reference, so as to restore the distorted images to normal scene images.

2. The peripheral sensing system as claimed in claim 1, wherein the disposed positions of the fisheye lenses scattered on the vehicle comprise a front bumper, a rear bumper, a left rear-view mirror, and a right rear-view mirror.

3. The peripheral sensing system as claimed in claim 1, wherein the image combining procedure comprises:

retrieving a trusted zone of the projection scene images respectively according to the disposed positions of the fisheye lenses of the projection scene images;

analyzing the plurality of feature points in the trusted zones of the projection scene images;

finding the feature points similar to those of adjacent projection scene images; and pasting the projection scene images into an overhead view according to the positions of the feature points.

4. The peripheral sensing system as claimed in claim 1, wherein the plane correcting function is expressed by:

$$P - E = (Q - E)/L(r_d, k);$$

wherein:

P is the positions of these central pixels before the correction;

Q is the positions of these central pixels after the correction;

E is a central point of a scene image;

$r_d$ is a distance from Q to E;

k is a deformation constant; and $L(r_d, k)$ is a deformation degree function of the scene image.

5. The peripheral sensing system as claimed in claim 1, wherein the deformation degree function is expressed by:

$$L(r_d, k) = 1 + k_1 * r_d^2 + k_2 * r_d^4 + \ldots + k_p * r_d^{2p},$$

wherein $k_1$, $k_2$, and $k_p$ are deformation constants.

6. The peripheral sensing system as claimed in claim 1, wherein the planar transition procedure comprises:

reading the corrected scene images;

determining a rotation amount of the corrected scene image according to the disposed positions of the fisheye lenses; and rotating the scene images according to the rotation amount, so as to generate the plurality of projection scene images.

7. The peripheral sensing system as claimed in claim 1, wherein the planar transition procedure further comprises setting a feature point of the scene images, and rotating the scene images into the projection scene images by taking the feature point as a reference.

8. The peripheral sensing system as claimed in claim 1, wherein the scene images are rotated into the projection scene images based on formula as follows:

$$M_{3\times 3}=K'_{3\times 3}R'_{3\times 3}K_{3\times 3}^{-1}+K'_{3\times 3}T'_{3\times 1}[abc]^T K_{3\times 3}^{-1};$$

wherein $M_{3\times 3}$ is the projection scene image;

$K'_{3\times 3}$ is an internal parameter matrix of the camera;

$R'_{3\times 3}$ is a rotation amount of a camera coordinates system relative to a world coordinates;

$T'_{3\times 1}$ is a displacement amount of the camera coordinates system relative to the world coordinates; and $[abc]^T$ is a relation matrix of a plurality of feature points in the scene image relative to a land surface.

9. A peripheral sensing system displaying an overhead view of a region around a vehicle, for shooting a real scene around the vehicle and generating the overhead view for display to a driver of the vehicle so as to assist a driver when maneuvering the vehicle, the system comprising:

a plurality of fisheye lenses, scattered on all sides of the vehicle, for shooting scene images;

a trip computer, for reading the scene images, and executing a plurality of built-in image processing procedures to combine the scene images into the overhead view of a region around the vehicle, wherein the plurality of image processing procedures comprise:

a distorted image correction procedure, for reading radially distorted scene images, calculating a central deformation ratio according to a plurality of pixels at central portions of the scene images, and correcting the scene images;

a planar transition procedure, for setting a rotation amount according to positions of the fisheye lenses, and rotating the scene images into projection scene images according to the rotation amount; and an image combining procedure, retrieving trusted zones of the projection scene images according to the disposed positions of the fisheye lenses of the projection scene images, so as to combine the images to the overhead view; and a screen, for displaying the overhead view when the vehicle is maneuvered, wherein the planar transition procedure further comprises setting a feature point of the scene images, and rotating the scene images into the projection scene images by taking the feature point as a reference.

10. A peripheral sensing system displaying an overhead view of a region around a vehicle, for shooting a real scene around the vehicle and generating the overhead view for display to a driver of the vehicle so as to assist a driver when maneuvering the vehicle, the system comprising:

a plurality of fisheye lenses, scattered on all sides of the vehicle, for shooting scene images;

a trip computer, for reading the scene images, and executing a plurality of built-in image processing procedures to combine the scene images into the overhead view of a region around the vehicle, wherein the plurality of image processing procedures comprise:

a distorted image correction procedure, for reading radially distorted scene images, calculating a central deformation ratio according to a plurality of pixels at central portions of the scene images, and correcting the scene images;

a planar transition procedure, for setting a rotation amount according to positions of the fisheye lenses, and rotating the scene images into projection scene images according to the rotation amount; and an image combining procedure, retrieving trusted zones of the projection scene images according to the disposed positions of the fisheye lenses of the projection scene images, so as to combine the images to the overhead view; and a screen, for displaying the overhead view when the vehicle is maneuvered, wherein the image combining procedure comprises:

retrieving a trusted zone of the projection scene images respectively according to the disposed positions of the fisheye lenses of the projection scene images;

analyzing the plurality of feature points in the trusted zones of the projection scene images;

finding the feature points similar to those of adjacent projection scene images; and pasting the projection scene images into an overhead view according to the positions of the feature points.

* * * * *